(12) United States Patent
Yoon

(10) Patent No.: US 8,800,039 B2
(45) Date of Patent: *Aug. 5, 2014

(54) SYSTEM AND METHOD FOR DETERMINING APPLICATION LAYER-BASED SLOW DISTRIBUTED DENIAL OF SERVICE (DDOS) ATTACK

(75) Inventor: Seung Yong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,230

(22) Filed: Aug. 10, 2012

(65) Prior Publication Data

US 2013/0042322 A1  Feb. 14, 2013

(30) Foreign Application Priority Data

Aug. 10, 2011  (KR) .................. 10-2011-0079705

(51) Int. Cl.
*G06F 21/00* (2013.01)

(52) U.S. Cl.
USPC ............................................. 726/23; 713/188

(58) Field of Classification Search
CPC ............ H04L 63/1416; H04L 63/1408; H04L 63/145; G06F 21/31
See application file for complete search history.

(56) References Cited

U.S. PATENT DOCUMENTS

| 7,818,786 | B2 * | 10/2010 | Yoon et al. ........................ 726/3 |
| 8,340,259 | B2 * | 12/2012 | Mahone et al. ............... 379/145 |
| 8,397,284 | B2 * | 3/2013 | Kommareddy et al. ........ 726/13 |
| 2002/0032871 | A1 * | 3/2002 | Malan et al. .................. 713/201 |
| 2005/0262563 | A1 * | 11/2005 | Mahone et al. ................. 726/22 |
| 2005/0278779 | A1 * | 12/2005 | Koppol et al. .................. 726/22 |
| 2006/0225133 | A1 * | 10/2006 | Balasubramaniyan et al. 726/22 |
| 2008/0028467 | A1 * | 1/2008 | Kommareddy et al. ........ 726/23 |
| 2009/0313698 | A1 * | 12/2009 | Wahl ............................... 726/22 |
| 2011/0302653 | A1 * | 12/2011 | Frantz et al. .................... 726/22 |

FOREIGN PATENT DOCUMENTS

| KR | 1020060049821 A | 5/2006 |
| KR | 1020110006566 A | 1/2011 |
| KR | 1020110044036 A | 4/2011 |

OTHER PUBLICATIONS

Yi Xie et al., "Monitoring the application-layer DDoS attacks for popular websites", IEEE/ACM Transactions on Networking, 2008, pp. 15-25, vol. 17.

* cited by examiner

Primary Examiner — Fikremariam A Yalew

(57) ABSTRACT

A technology for defending a Distributed Denial-of-Service (DDoS) attack is provided. A system for determining an application layer-based slow DDoS attack may include a packet collecting unit to collect a packet in a network, a packet parsing unit to extract at least one header field from the collected packet, and a DDoS attack determining unit to determine whether a DDoS attack against the packet is detected, using a session table and a flow table.

9 Claims, 5 Drawing Sheets

SYSTEM AND METHOD FOR DETERMINING APPLICATION LAYER-BASED SLOW DISTRIBUTED DENIAL OF SERVICE (DDOS) ATTACK

CROSS-REFERENCE TO RELATED APPLICATION

This application claims the benefit of Korean Patent Application No. 10-2011-0079705, filed on Aug. 10, 2011, in the Korean Intellectual Property Office, the disclosure of which is incorporated herein by reference.

BACKGROUND

1. Field of the Invention

The present invention relates to a technology of defending a Distributed Denial-of-Service (DDoS) attack, and more particularly, to a technology of detecting and responding to an application layer (layer 7)-based slow DDoS attack that causes connection resource consumption using only a small amount of traffic.

2. Description of the Related Art

A Distributed Denial-of-Service (DDoS) attack refers to an attack by a plurality of unspecified attackers to send a large amount of data, to sharply reduce a performance of a target network or system, so that a service provided by the system may be unavailable, with intent to interrupt a normal service of the system.

In the past, Transmission Control Protocol (TCP)/User Datagram Protocol (UDP)/Internet Control Message Protocol (ICMP) flooding L3/L4 attacks that consume resources, such as a network bandwidth, a Central Processing Unit (CPU) of a server, a memory, and the like, mainly occurred. However, the above attacks were incapacitated due to development of an anti-DDoS solution.

However, recently, a DDoS attack in an application layer L7 that may not be incapacitated by the anti-DDoS solution, is increasing.

In particular, among application layer L7 DDoS attacks, a fast attack of a flooding, such as a Hypertext Transfer Protocol (HTTP) Get flooding, used in a famous DDoS attack tool, namely a NetBot Attacker, tends to be changed to a slow attack, such as a slowloris, or a r-u-dead-yet (RUDY)/OWASP HTTP post tool.

This is because such a change may be easily detected, since an L7 flooding attack in addition to L3/L4 attacks need to ensure a large number of zombie Personal Computers (PCs), and since a large amount of traffic are caused during an attack.

Most of application layer L7 DDoS attacks use a weak point of an HTTP, and two types of slow attack causing L7 connection resource consumption are known as follows:

In the present specification, the term 'connection' may be used interchangeably to the term 'session', when necessary.

1. Slow request headers: Slowloris attack
2. Slow request bodies: RUDY/OWASP HTTP post attack A slowloris attack using slow request headers refers to a DDoS attack tool against an Apache web server. In other words, the slowloris attack refers to an attack to transfer an incomplete HTTP Get Request message to a server, to consume connection resources of a corresponding web server in a short time, and to enable a service to be unavailable. When connection setting is performed through a legal TCP 3-way handshaking process, an HTTP Get Request message may be transmitted, however, a keyword 'CRLFCRLF' (|0d0a0d0a| or '\r\n\r\n')' indicating an end of a Request message may not be transmitted. The web server may maintain a corresponding connection in an open state, until a Get Request message ends, that is, until a complete Request message is completely received. As a result, all connections of the web server may be filled with connections caused by the attack, and a new connection may not be connected any more.

Currently, to defend the slowloris attack, an IIS web server sets a timeout value when receiving a request header. When a complete request header message is not received within a timeout time, the IIS web server may close a corresponding connection. However, since such a defense scheme is not applied in the Apache web server, the Apache web server is still vulnerable to a corresponding attack.

An attack tool using slow request bodies is classified into two types: a RUDY and an OWASP HTTP post tool that may use the same attack scheme. When a complete HTTP Post Request Header message is transferred to a web server targeted for an attack, an attack may be attempted by very slowly transmitting a small amount of a body part. Actually, there is an example in which an attack is attempted by transmitting 1 byte of the body part per 110 seconds.

Accordingly, it is difficult to defend RUDY or OWASP HTTP post attack, using a scheme of setting a timeout of a request header, such as a slowloris attack, and depending the slowloris.

A corresponding attack may be performed using a scheme by which a client transmits an HTTP Post Request message when normal TCP session connection is established between the client and a server. When a content-length field in the HTTP Post Request message is set to '20000' and the HTTP Post Request message is transmitted, the server may ensure resources of the server corresponding to 20,000 bytes, and may open a corresponding session until all data is received. However, the client may transmit 1 byte of a Post Body message per 1 second, and the server may maintain the session to be open while all of the data is received, namely during 20,000 seconds (about 5 hours and 30 seconds).

Since most web servers store a body of 2 gigabytes (GB) or greater for a single HTTP Post Request, connection resources may be occupied for a very long period of time. Additionally, a web server may basically enter a service denial state by only 20,000 connections resources, regardless of hardware performance (a high-performance CPU, a memory, and the like).

Accordingly, all connection resources that may be provided by a corresponding server may be easily consumed using only a small number of attack systems, which may result in a success in a DDoS attack.

Currently, to detect such an attack, RequestReadTimeoutbody may be set to '30' through a ModSecurity, namely an open source web firewall for the Apache web server, and may defend the attack. Such a scheme may be performed to detect the attack when a request body is not received for 30 seconds.

However, when an attack is performed by an infected zombie, the above scheme may not be regarded as an effective scheme due to an increase in a probability of a DoS state, since 30 seconds are too long to consume all sessions that may be provided by a corresponding server.

Additionally, there is a scheme of limiting a set amount of data of a web site input form, and detecting an attack when a size of data input to a POST exceeds a preset amount. For example, since both an ID field and a password field do not exceed 20 bytes in general, a login form may prevent the ID field and the password field from exceeding corresponding sizes. Conversely, when the ID field and the password field exceed corresponding sizes, an attack may be detected. However, since all range values that may be included in a corresponding form need to be recognized with respect to a characteristic of a web server and all POST forms, a performance issue may occur. Additionally, the scheme may be ineffective due to a limitation in practical application.

As described above, since a fast DDoS attack of a typical flooding performs an attack using a large amount of traffic, an amount of traffic is significantly increased compared to a normal case, and the attack may be easily detected. However, since the above-described slow DDoS attack using the connection resource consumption uses the weak point of an HTTP by using only a small amount of traffic in normal TCP connection, it is very difficult to detect the attack.

SUMMARY

According to an aspect of the present invention, there is provided a system for determining an application layer-based slow Distributed Denial-of-Service (DDoS) attack, including: a packet collecting unit to collect a packet in a network; a packet parsing unit to extract at least one header field from the collected packet; and a DDoS attack determining unit to determine whether a DDoS attack against the packet is detected, using a session table and a flow table.

According to another aspect of the present invention, there is provided an operation method of a system for determining an application layer-based slow DDoS attack, including: collecting, by a packet collecting unit, a packet in a network; extracting, by a packet parsing unit, at least one header field from the collected packet; and determining, by a DDoS attack determining unit, whether a DDoS attack against the packet is detected, using a session table and a flow table, wherein the at least one header field includes at least one of a protocol, a source Internet Protocol (IP), a source port, a destination IP, a destination port, Transmission Control Protocol (TCP) flags, a sequence number, and a window size.

EFFECT

According to embodiments of the present invention, it is possible to effectively detect and respond to an application layer-based slow Distributed Denial-of-Service (DDoS) attack (for example, a slow layer 7 DDoS attack) that induces connection resource consumption using a small amount of traffic.

Additionally, according to embodiments of the present invention, it is possible to detect an application layer-based attack, such as a slow DDoS attack, using a small amount of traffic and at a low speed.

Furthermore, according to embodiments of the present invention, it is possible to detect and defend an attack by all existing slow DDoS attack tools, and to effectively defend any DDoS attack that will appear, by using a defense scheme employing a characteristic of a slow DDoS attack, for example 'connection resource consumption' that is a common characteristic of a slowloris attack using slow request headers, or a RUDY/OWASP HTTP post attack using slow request bodies.

Moreover, according to embodiments of the present invention, processing may be performed in a network layer that is lower than an application layer, and thus it is possible to realize an effective performance.

In addition, according to embodiments of the present invention, it is possible to effectively prevent a DDoS attack in a network and a host.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
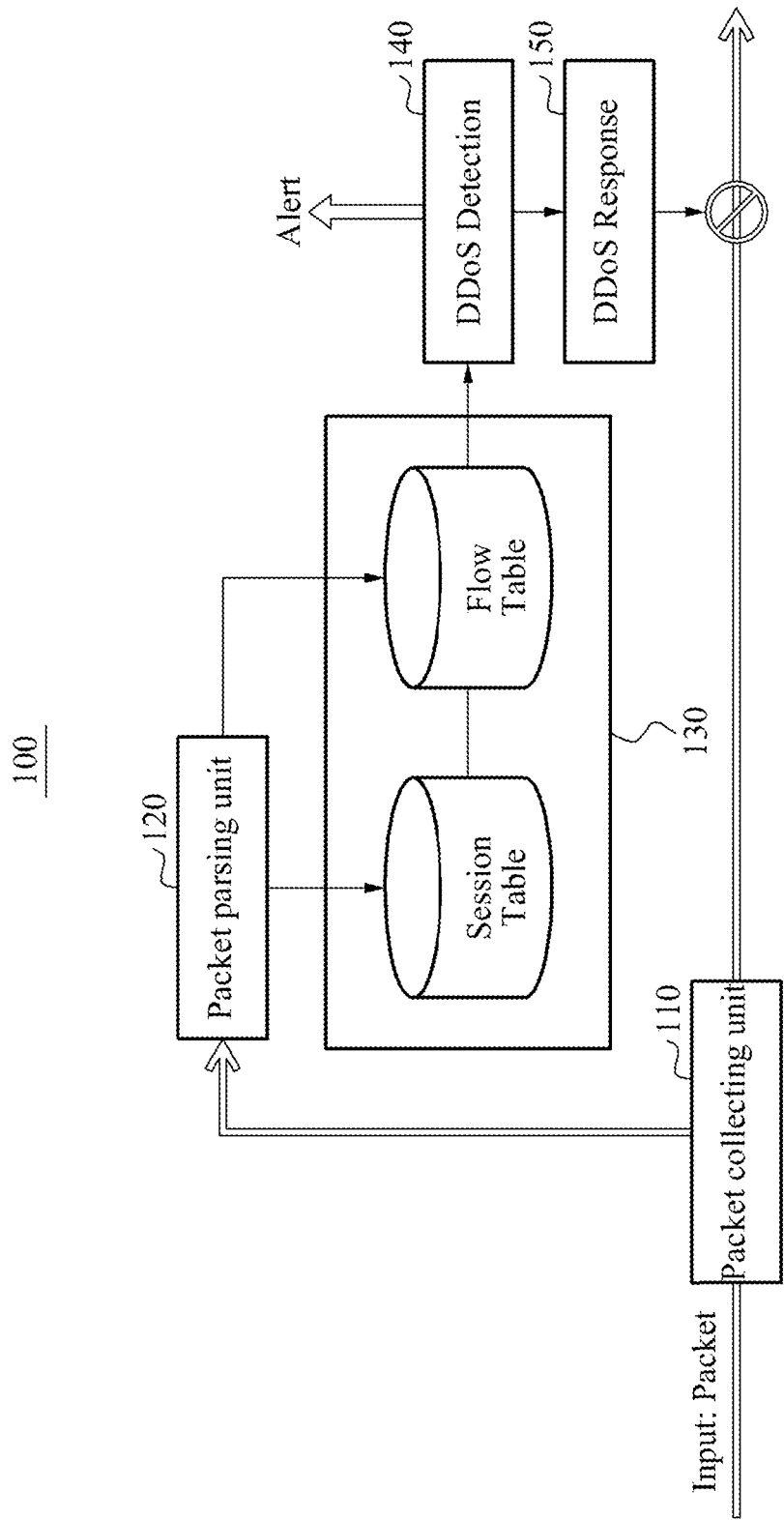
FIG. 1 is a diagram illustrating a system for determining an application layer-based slow Distributed Denial-of-Service (DDoS) attack according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a system 100 for determining an application layer-based slow Distributed Denial-of-Service (DDoS) attack according to an embodiment of the present invention.

The system 100 of FIG. 1 may include a packet collecting unit 110, a packet parsing unit 120, and a DDoS attack determining unit 130.

The packet collecting unit 110 may collect a packet in a network.

The packet parsing unit 120 may extract at least one header field from the collected packet.

The at least one header field may include at least one of a protocol, a source Internet Protocol (IP), a source port, a destination IP, a destination port, Transmission Control Protocol (TCP) flags, a sequence number, and a window size.

In other words, to detect and respond to the application layer-based slow DDoS attack, the system 100 may collect the packet in the network, may parse the collected packet, and may extract header fields that are required to detect and respond to an attack.

The DDoS attack determining unit 130 may determine whether a DDoS attack against the packet is detected, using a session table and a flow table.

The DDoS attack determining unit 130 may manage the session table and the flow table, using the at least one header field extracted by the packet parsing unit 120.

The DDoS attack determining unit 130 may track and manage states of session entries, using the session table, based on the protocol, the source IP, the source port, the destination IP, and the destination port.

Information on states of sessions tracked and managed in the session table, and information on a specific session state measured in the flow table using the information may be used as basic information to detect a DDoS attack. When the DDoS attack is detected, the DDoS attack determining unit 130 may generate an alert message indicated by reference numeral 140, and may block the detected DDoS attack through a response module indicated by reference numeral 150.

Additionally, the DDoS attack determining unit 130 may measure session state information, using the flow table, based on the protocol, the source IP, the destination IP, and the destination port.

The DDoS attack determining unit 130 may determine whether the DDoS attack is detected, by measuring, as the session state information, information on a number of sessions in which a legal session connection is established through a TCP 3-way handshaking process, or by measuring, as the session state information, information on a number of sessions in which a connection is set and that are legally terminated by a reset packet or a FIN packet, or by measuring, as the session state information, information on a number of sessions in which a connection is currently set and in which data transmission is performed.

The session table may be a basic 5-tuple for a setting of a TCP connection, and may track and manage states of session entries, based on at least one of the protocol, the source IP, the source port, the destination IP, and the destination port.

A state and transition of a session tracked in the session table will be further described with reference to FIG. 2.

Figure 2:
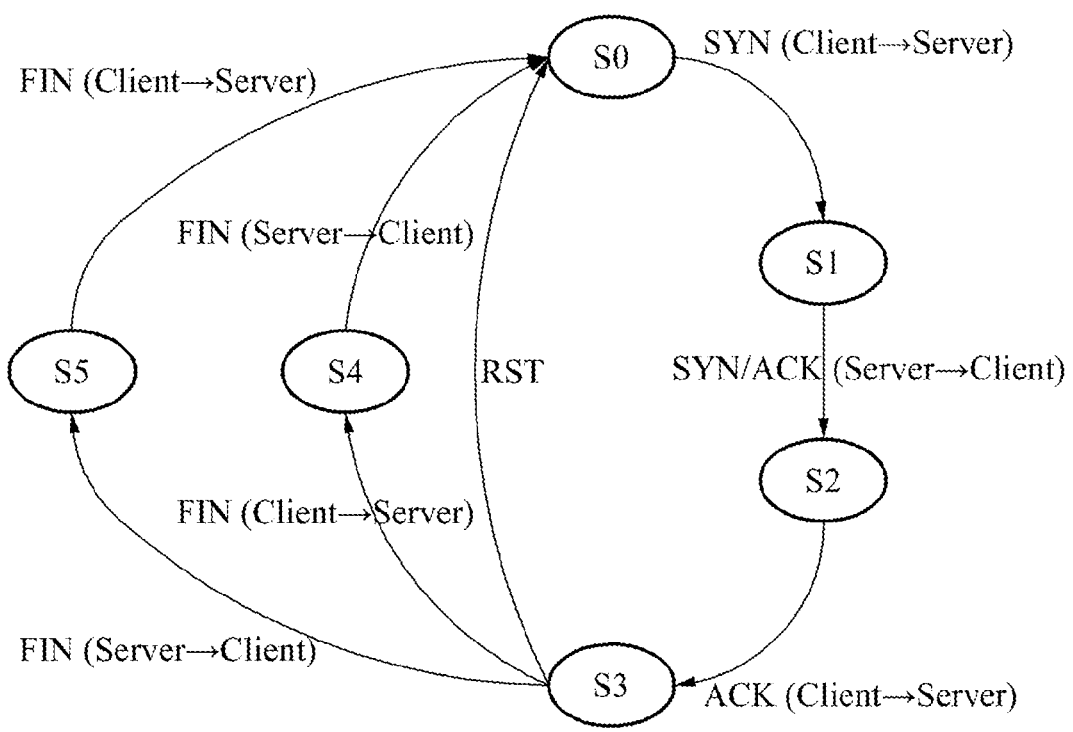
FIG. 2 is a diagram illustrating a state and transition of a session tracked in a session table according to an embodiment of the present invention.

FIG. 2 is a diagram illustrating a state and transition of a session tracked in a session table according to an embodiment of the present invention.

A system for determining an application layer-based slow DDoS attack according to an embodiment of the present invention may basically track a process of setting session connection through a 3-way handshaking, and of terminating a session through a 4-way handshaking.

A number of managed sessions and a number of managed session state information may be measured by a flow table managed based on a 4-tuple (a protocol, a source IP, a destination IP, and a destination port).

Specific state information regarding a session measured in the flow table is provided as follows:

Session trial count: Information on a number of times a session connection is tried by transmitting a SYN packet from a client to a server Established session count: Information on a number of sessions in which a legal session connection is established through a TCP 3-way handshaking process Terminated session count: Information on a number of sessions in which a connection is set and that are legally terminated by a reset packet or a FIN packet Active session count: Information on a number of sessions in which a connection is currently set and in which data transmission is performed When a SYN packet is transmitted from a client to a server for TCP session connection, and when a session entry does not exist by searching for the session entry from a session table, a new entry may be generated, and an initial state 'S0' may transition to a state 'S1'.

In this instance, an entry may also be generated in a flow table, and the 'session trial count' may be incremented by '1.' When a SYN/ACK packet is transmitted from the server to the client, the state 'S1' may transition to a state 'S2.' When a last ACK packet of 3-way handshaking is transmitted from the client to the server, the state 'S2' may transition to a state 'S3.'

In this instance, an 'established session count' of a corresponding entry in the flow table may be incremented by '1,' and an 'active session count' may also be incremented by '1.'

When session connection is established, when data transmission is established, and when a reset packet or a FIN packet is transmitted, an appropriate session state among states 'S3', 'S4', and 'S5' may transition to the initial state 'S0.'

In this instance, when a session is terminated, the 'terminated session count' of the flow table may be incremented by '1' and the 'active session count' may be reduced by '1.'

As a result, the session table and the flow table may be organically linked to each other by tracking the process of setting session connection and terminating the session, and accordingly information required to detect a DDoS attack may be generated.

The information generated by the session table and the flow table may be used for determination by the DDoS attack determining unit 130.

Figure 3:
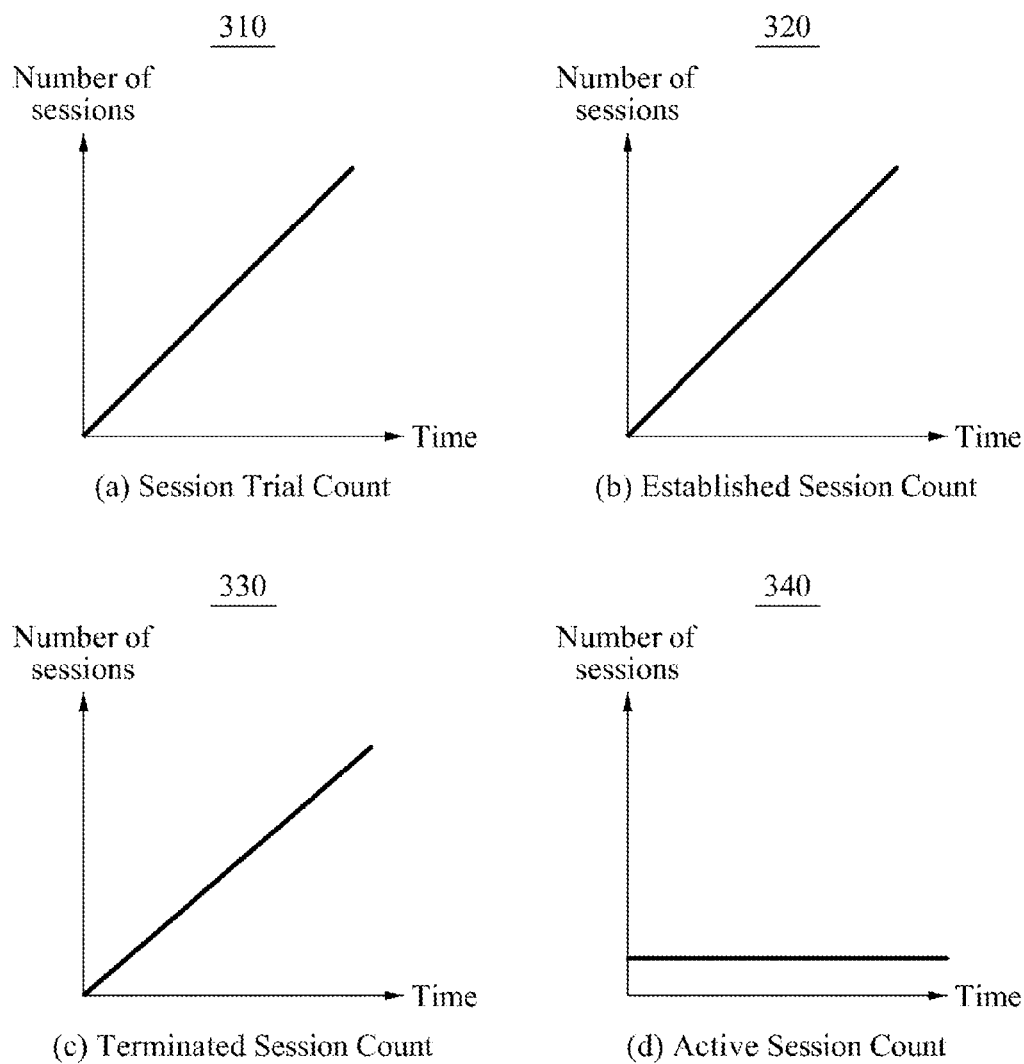
FIGS. 3 and 4 are graphs illustrating session states based on a session connection according to an embodiment of the present invention.
Figure 4:
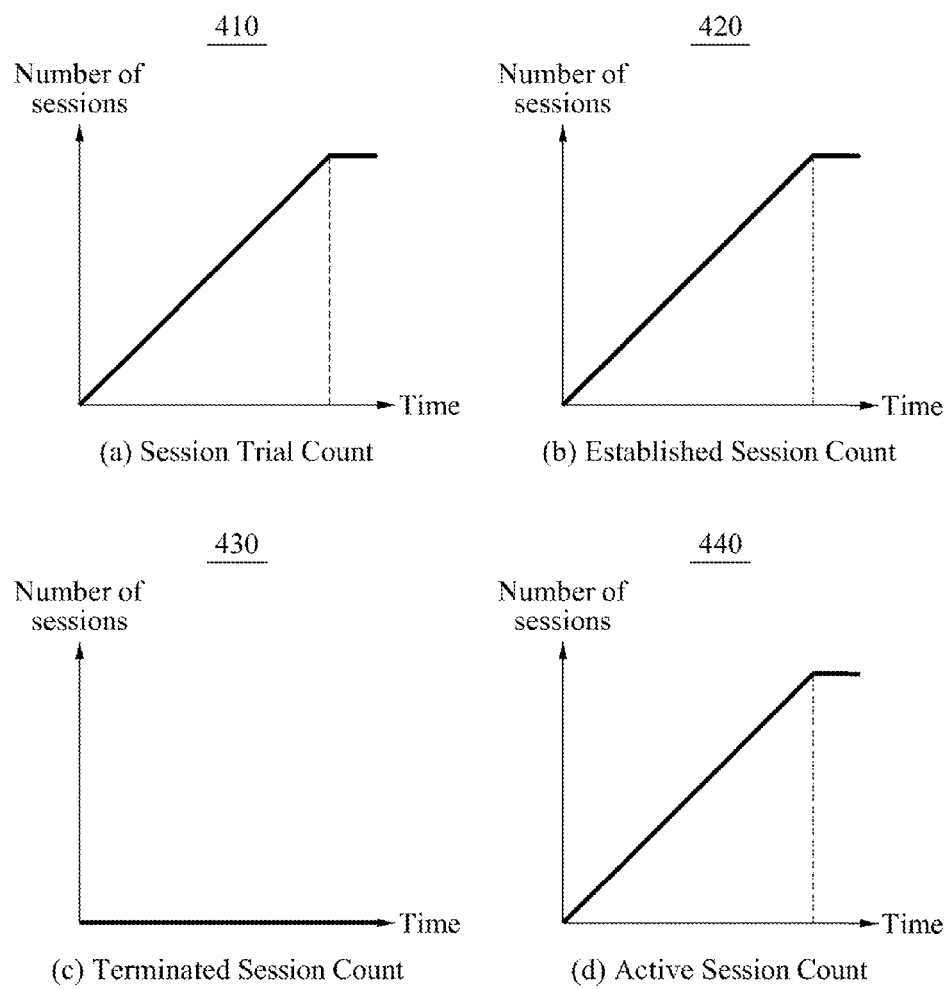

FIGS. 3 and 4 are graphs illustrating session states based on a session connection according to an embodiment of the present invention.

When a legal user's Personal Computer (PC) is used as a client, and when a service request is sent to a server, graphs 310, 320, 330, and 340 of FIG. 3 may be drawn.

When session connection is tried, the session connection may be established a number of session connection trials. When data transmission is completed, corresponding sessions may almost be terminated.

As a 'session trial count' of the graph 310 increases, both an 'established session count' of the graph 320 and a 'terminated session count' of the graph 330 may increase.

The above result may enable a low 'active session count' of the graph 340 to be maintained within a predetermined range of a number of sessions, and accordingly it is possible to maintain a normal state.

However, when a zombie PC is used as a client, and when a DDoS attack is attempted against a server, graphs 410, 420, 430, and 440 of FIG. 4 may be drawn.

FIG. 4 shows a distinctly different pattern from FIG. 3 that illustrates an example in which a legal user requests a service.

When session connection is tried a number of session connection trials set by an attacker, the session connection may be established. However, a session may be prevented from being terminated, by delaying as much as possible completion of data transmission for a corresponding session.

As a 'session trial count' of the graph 410 increases, an 'established session count' of the graph 420 may increase, but a 'terminated session count' of the graph 430 may remain unchanged. The above result may enable an 'active session count' of the graph 440 to increase by a number of sessions as an attacker intended.

As illustrated in the graphs 310 to 340 of FIG. 3 and the graphs 410 to 440 of FIG. 4, a system for determining an application layer-based slow DDoS attack according to an embodiment of the present invention may detect a DDoS attack, using different types of characteristics in an example in which a service is requested between a legal user's PC and a zombie PC.

Specifically, the DDoS attack determining unit 130 may determine a slow DDoS attack in an application layer, using the following three characteristics:

First, when the 'active session count' corresponds to a threshold, the DDoS attack determining unit 130 may determine that the slow DDoS attack is detected in the application layer.

Specifically, when a slow DDoS attack occurs in an application layer, the DDoS attack determining unit 130 may determine whether the slow DDoS attack continuously increases to a predetermined level, since a low active session count is maintained in a predetermined range in case of a normal user.

When the active session count, namely information on a number of sessions in which a connection is currently set and in which data transmission is performed, is increased over the threshold that may not be obtained in a case of a normal user, the DDoS attack determining unit 130 may regard an increase in the active session count as a DDoS attack.

Second, in a case of $$\frac{\Delta S}{\Delta t} \cong \frac{\Delta E}{\Delta t} \gg \frac{\Delta T}{\Delta t},$$

the DDoS attack determining unit 130 may determine that the slow DDoS attack is detected in the application layer.

In other words, when a variation ΔT in the 'terminated session count' caused by a change in time is significantly reduced, compared to a variation ΔS in the 'session trial count' and a variation ΔE in the 'established session count', the DDoS attack determining unit 130 may regard a reduction in the variation ΔT as a slow DDoS attack.

Specifically, when points in time 'n' and 'n+1' in an x axis indicating the change in time are indicated by 'tn' and 'tn+1', respectively, a variation Δt in the time may be represented by 'Δt=tn−tn+1.' Similarly, the variation ΔS in the 'session trial count' may be represented by 'ΔS=Sn−Sn+1,' and the variation ΔE in the 'established session count' may be represented by 'ΔE=En−En+1.' Additionally, the variation ΔT in the 'terminated session count' may be represented by 'ΔT=Tn−Tn+1,' and a variation ΔA in the 'active session count' may be represented by 'ΔA=An−An+1.'

In other words, in a case of a normal user, when $$\frac{\Delta S}{\Delta t} \cong \frac{\Delta E}{\Delta t} \gg \frac{\Delta T}{\Delta t}$$

or the variation ΔT in the 'terminated session count' caused by the change in the time is significantly reduced, compared to the variations ΔS and ΔE, the DDoS attack determining unit 130 may determine that a slow DDoS attack occurring in the application layer is detected.

Third, when ΔS, ΔE, ΔT, and ΔA have a value of "0" and when An is c (c is a constant), the DDoS attack determining unit 130 may determine that the slow DDoS attack is detected.

In other words, in a case of a normal user, a value of the 'session trial count', a value of the 'established session count', and a value of the 'terminated session count' may be changed, despite a value of the 'active session count' being maintained. When the slow DDoS attack is performed, the DDoS attack determining unit 130 may detect that a constant value of the 'active session count' is maintained, and may determine that the slow DDoS attack is detected in the application layer.

Therefore, by using the system for determining an application layer-based slow DDoS attack, it is possible to effectively detect and respond to an application layer-based slow DDoS attack (for example, a slow layer 7 DDoS attack) that induces connection resource consumption using only a small amount of traffic.

In addition, by using the system for determining an application layer-based slow DDoS attack, it is possible to detect an application layer-based attack, such as a slow DDoS attack, using a small amount of traffic and at a low speed. Additionally, it is possible to detect and defend an attack by all existing slow DDoS attack tools, and to effectively defend any DDoS attack that will appear, by using a defense scheme employing a characteristic of a slow DDoS attack, for example 'connection resource consumption' that is a common characteristic of a slowloris attack using slow request headers, or a RUDY/OWASP HTTP post attack using slow request bodies.

Furthermore, according to embodiments of the present invention, processing may be performed in a network layer that is lower than an application layer, and thus it is possible to realize an effective performance. In addition, it is possible to effectively prevent a DDoS attack in a network and a host.

Figure 5:
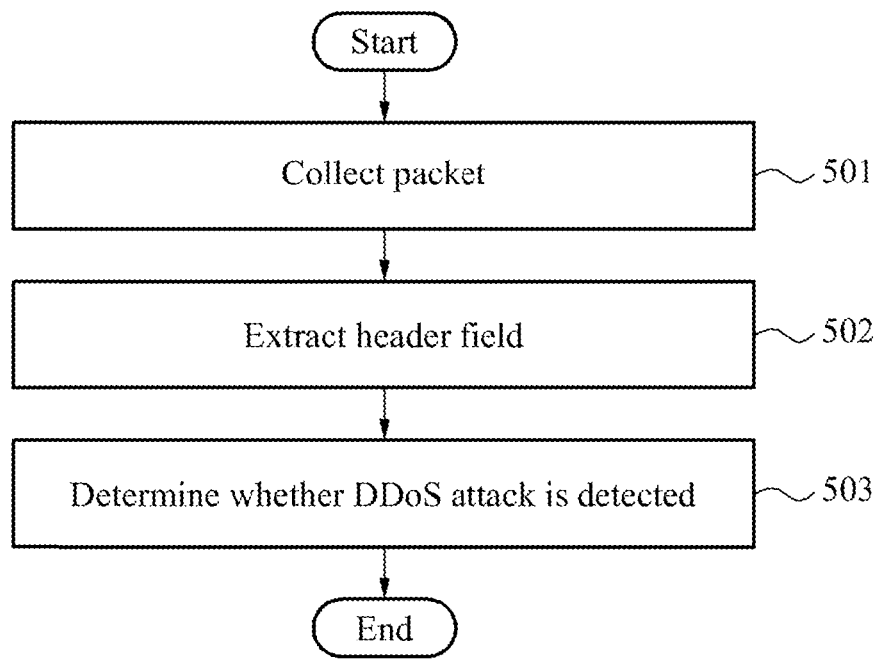
FIG. 5 is a flowchart illustrating a method of determining an application layer-based slow DDoS attack according to an embodiment of the present invention.

FIG. 5 is a flowchart illustrating a method of determining an application layer-based slow DDoS attack according to an embodiment of the present invention.

Referring to FIG. 5, in operation 501, a packet collecting unit may collect a packet in a network. In operation 502, a packet parsing unit may extract at least one header field from the collected packet. In operation 503, a DDoS attack determining unit may determine whether a DDoS attack against the packet is detected, using a session table and a flow table.

In this instance, the at least one header field may include at least one of a protocol, a source IP, a source port, a destination IP, a destination port, TCP flags, a sequence number, and a window size.

In operation 503, states of session entries may be tracked and managed, using the session table, based on the protocol, the source IP, the source port, the destination IP, and the destination port.

Additionally, in operation 503, session state information may be measured, using the flow table, based on the protocol, the source IP, the destination IP, and the destination port.

The operation method of the system for determining an application layer-based slow DDoS attack according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for determining an application layer-based slow Distributed Denial-of-Service (DDoS) attack, the system comprising:
a packet collecting unit to collect a packet in a network;
a packet parsing unit to extract at least one header field from the collected packet; and a DDoS attack determining unit to generate a flow table including a plurality of entries, track and manage session information for each entry in the flow table, and determine, using an active session count for an entry, whether an application layer-based slow DDoS attack is detected, the session information for each entry including the active session count, wherein the session information includes an established session count, the session information includes a session trial count, and the DDoS attack determining unit determines whether the application layer-based slow DDoS attack is detected based on variations in a time interval of the session trial count, the established session count, a terminated session count, and the active session count of the entry and based on a comparison of the active session count of the entry to a constant.

2. The system of claim 1, wherein the at least one header field comprises at least one of a protocol, a source Internet Protocol (IP), a source port, a destination IP, a destination port, Transmission Control Protocol (TCP) flags, a sequence number, and a window size.

3. The system of claim 2, wherein the DDoS attack determining unit tracks and manages the session information for each entry in the flow table using a session table, based on the protocol, the source IP, the source port, the destination IP, and the destination port.

4. The system of claim 1, wherein the DDoS attack determining unit determines whether a DDoS attack is detected by comparing the active session count of the entry to a threshold.

5. The system of claim 1, wherein the DDoS attack determining unit determines whether a DDoS attack is detected using a comparison of a variation during a time interval of a terminated session count of the entry with a variation during the time interval of the session trial count of the entry.

6. The system of claim 1, wherein the DDoS attack determining unit determines whether a DDoS attack is detected using a comparison of a variation during a time interval of a terminated session count of the entry with a variation during the time interval of the established session count of the entry.

7. An operation method of a system for determining an application layer-based slow Distributed Denial-of-Service (DDoS) attack, the operation method comprising:

collecting, by a packet collecting unit, a plurality of packets in a network;

extracting, by a packet parsing unit, at least one header field from each of the collected packets;

generating a flow table including a plurality of entries using the extracted header fields;

tracking and managing session information for each entry in the flow table using the extracted header fields; and determining, by a DDoS attack determining unit, whether an application layer-based slow DDoS attack is detected, using an active session count of the session information for an entry, wherein the at least one header field comprises at least one of a protocol, a source Internet Protocol (IP), a source port, a destination IP, a destination port, Transmission Control Protocol (TCP) flags, a sequence number, and a window size, wherein the session information for each entry includes at least one of a session trial count, an established session count, and a terminated session count, and wherein determining whether an application layer-based slow DDOS attack is detected includes comparing a variation during a time interval of the terminated session count of the entry with a variation during the time interval of the session trial count of the entry, and comparing the active session count of the entry to a threshold.

8. The method of claim 7, wherein determining whether a DDOS attack is detected includes comparing a variation during a time interval of the terminated session count of the entry with a variation during the time interval of the established session count of the entry.

9. The method of claim 7, wherein determining whether a DDOS attack is detected includes evaluating variations in a time interval of the session trial count, established session count, terminated session count, and active session count of the entry and comparing the active session count of the entry to a constant.

* * * * *